United States Patent [19]
Dibley

[11] 3,929,279
[45] Dec. 30, 1975

[54] FLIGHT PATH CALCULATOR
[76] Inventor: Hugh P. K. Dibley, 18 Queens Gate Mews, London, SW7 5QJ, England
[22] Filed: May 14, 1974
[21] Appl. No.: 469,817

[30] Foreign Application Priority Data
May 15, 1973 United Kingdom............... 23071/73

[52] U.S. Cl............................................. 235/88 N
[51] Int. Cl.² ........................................ G06C 3/00
[58] Field of Search...................... 235/78 N, 88 N

[56] References Cited
UNITED STATES PATENTS
2,506,299   5/1950   Isom............................... 235/61 NV

| 3,255,961 | 6/1966 | Cumberpatch | 235/78 N |
| 3,279,695 | 10/1966 | Krause | 235/78 N |
| 3,609,299 | 9/1971 | Wright | 235/78 N X |
| 3,693,873 | 9/1972 | Otte | 235/88 N |
| 3,825,180 | 7/1974 | Gallagher | 235/78 N |

Primary Examiner—Lawrence R. Franklin
Attorney, Agent, or Firm—Kemon, Palmer & Estabrook

[57] ABSTRACT

A flight slope calculator having relatively movable distance and altitude scales arranged to facilitate the vertical navigation of aircraft and in particular to permit a pilot to ascertain the point at which he should start his descent during the approach to an airfield.

2 Claims, 2 Drawing Figures

FLIGHT PATH CALCULATOR

This invention is concerned with aircraft navigation and particularly with the vertical navigation of aircraft approaching or leaving airfields.

A typical cruising height for modern aircraft is 35,000 ft., an altitude of this order being selected because fuel costs for an aircraft flying at this height are less than for an aircraft flying at lower altitudes. As a pilot approaches an airfield he will normally be told that he has to cross some point on the approach path, a known distance from the airfield, at a particular height, or possible at or below a particular height. When he is given this information, the pilot estimates a descent path which will ensure that he is at the required height when he crosses the said point. Some pilots will start their descent as soon as they receive the approach information in order to ensure that they have reached the required lower altitude in time. Others will leave their descent until they reach a point at which the normal slope path for the aircraft will ensure that the required altitude is reached only a little before they arrive at the given point.

Too early a descent to the given altitude is undesirable for a number of reasons. In the first place, it means that additional flying must be done at the lower altitude and this results in additional fuel costs. Secondly, the additional flying at the lower altitude is carried out at a slower ground speed than that of an aircraft still flying at its cruising altitude and consequently time is wasted by too early a descent. As an example, the pilot of a Boeing 747 who descends 1 minute (8 miles) early and extends flaps and gear on reaching circuit altitude uses an extra 170 gallons of fuel and adds 2 minutes to the sector time. A consequence of the delay caused by an early descent is that the order of a succession of aircraft approaching the airport may change if some pilots start their descent at the optimum point while others start to come down much earlier than the optimum point. This may confuse air traffic controllers and is clearly undesirable. A further consequence is that additional calls between the air traffic controller and the pilot are required in order to enable the air traffic controller to keep track of the position of a number of aircraft whose pilots adopt different descent procedures.

Finally, an aircraft which flies at the lower altitude over an excessive approach distance causes unnecessary noise along a part of the approach path which could have been flown at a higher altitude and this part may well be over a town served by the airport.

The point at which to descend is normally calculated mentally by the air crew. Although with a fixed descent gradient the calculation is not difficult, the possibility of error exists when the air crew have numerous other tasks to attend to. Furthermore, it may lead to the adoption of slopes (such as 300 ft. per mile) which are simple for mental arithmetic but not optimum for the aircraft. It would of course be possible to use an electronic computer to programme the vertical descent but this is unnecessarily complex.

The present invention provides a flight slope calculator which comprises a first member having a surface calibrated with altitude scale markings and a second member having a surface calibrated with distance scale markings, the two members being mounted for relative movement so that the markings on one can be read off against the markings on the other. Preferably, the two members are of circular form and are mounted for relative rotation about a common axis. With such a calculator, calibrated for the aircraft in question, once the required altitude at a given distance-to-go has been set, the required height at any time during the descent to that altitude is shown. Thus, when a pilot is told, for example, that he must cross a given point, 20 miles from an airport or radio beacon, at 14,000 ft., he sets the 20 mile indication on one sliding element against the 14,000 ft. indication on the other sliding element. If he is cruising at a height of 35,000 ft., the distance value against the 35,000 ft. marking on the calculator will give him the distance from the airport at which he should start his descent. At any point along this descent path he can compare his distance-to-go with the distance shown against his known height on the calculator, with the sliding elements as originally positioned, to ensure that he has been following the required descent path and, in the event of any discrepancy, he can adjust his rate of descent until the required relationship between distance and altitude is once again established.

It may be required that at some particular height, for example at 10,000 ft., the aircraft is to decelerate in level flight from 340 knots IAS to 250 knots. The markings on the altitude element of the calculator may allow for this by providing a discontinuity in the progressive reduction of altitude along the scale, for example by arranging that the altitude marking represents 10,000 ft., over a portion of the scale corresponding to 5 to 10 miles on the distance scale.

Although a constant descent gradient is preferred, since height is then simply related to distance and rate of descent is directly proportional to ground speed, the scale may be modified to represent a non-linear descent path if desired. As an example, the altitude scale may be linear from 30,000 ft., to 21,000 ft. and may then become more cramped, representing a change from "power on" to "power off."

In order that the invention may be better understood, one example of apparatus embodying the invention will now be described with reference to the accompanying drawings, in which:-

Figure 1:
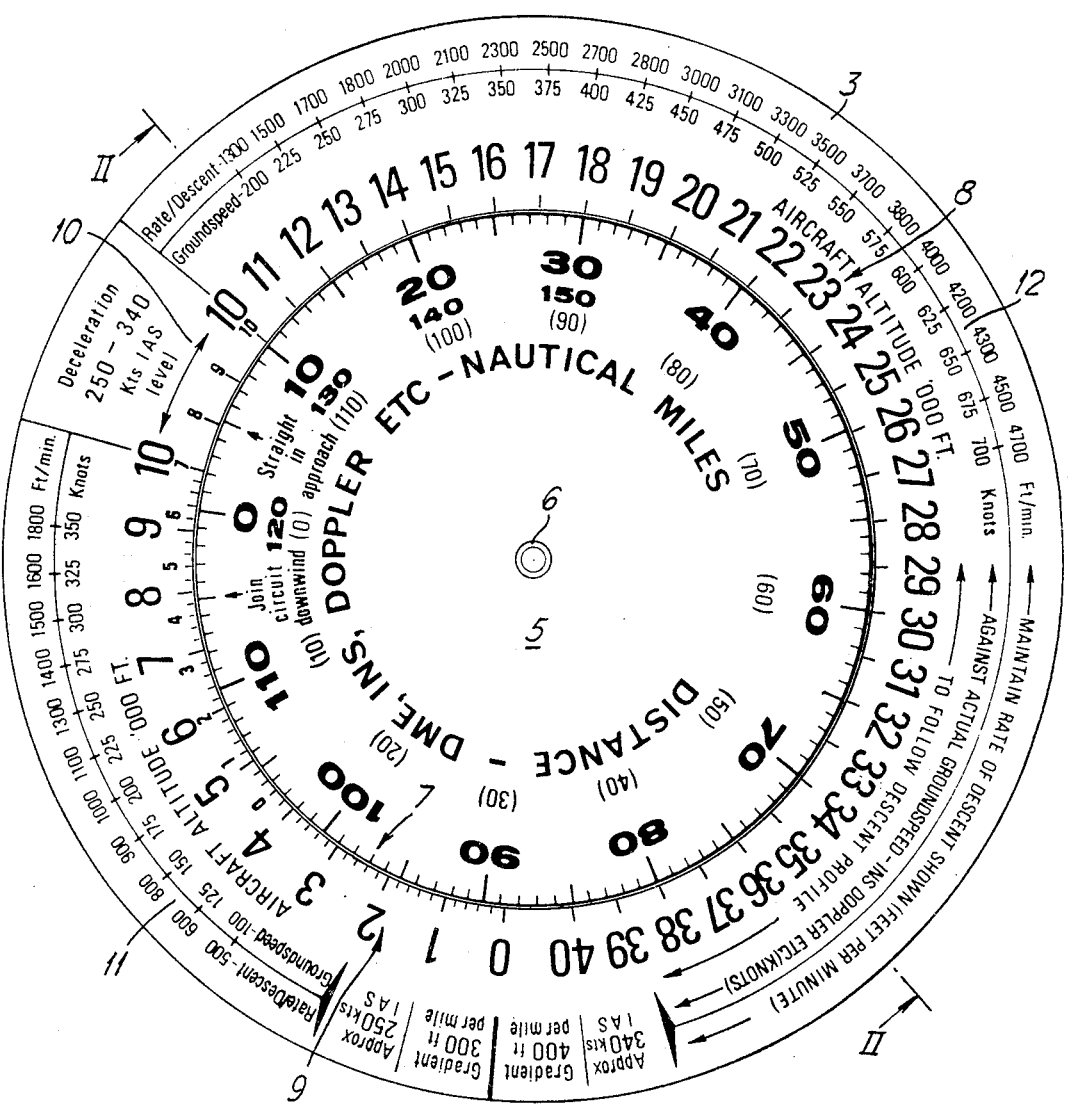
FIG. 1 shows a circular slide calculator embodying the present invention.

The calculator shown in the drawings consists of a first disc 3 formed with a circular recess 4 in which is located a second disc 3 formed with a circular recess 4 in which is located a second disc 5, the two discs being mounted for relative rotation on a common central shaft 6. The inner disc 5 is calibrated with a scale 7 of distance markings in nautical miles and the outer portion of the larger disc 3 is calibrated with aircraft altitude in thousands of feet. The calibration on the outer disc takes the form of a first section 8, representing altitudes from 10,000 ft. upwards, in which the markings are uniformly spaced, corresponding to a first rate of descent; a second section 9 with altitude markings below 10,000 ft., the lower altitude markings being spaced, in this example, by a distance greater than the spacing between the markings on the scale section 8, representing a less steep descent; and a third section 10 in which there is no change in aircraft altitude, this section corresponding to a period of level flight during which deceleration takes place.

Around the periphery of the outer circular element are shown rates of descent corresponding to actual ground speeds when maintaining the two gradients (400 ft. per mile and 300 ft. per mile) appropriate to the higher speed (340 knots) and the lower speed (250 knots), respectively. The values of the ground speeds shown cover the range that may be achieved. For a given indicated airspeed, ground speed at a particular point is determined by the true airspeed which decreases with altitude, and the wind component. The effect of wind is offset by keeping the rate of descent proportional to the actual ground speed, as indicated by the scale on the outer element. If an aircraft is able to achieve a rate of descent of 1,000 ft. per minute more than that required to maintain a normal (300 ft. per mile) gradient in still air, tail winds of 200 knots can be accommodated throughout descent. This would be equivalent to a wind of some 400 knots at cruise altitude; the highest recorded wind velocity to date is 360 knots.

This procedure also takes account of variations in aircraft weight, which can have a significant effect upon an aircraft's descent gradient at a particular indicated airspeed with a given amount of engine power.

Let it be assumed that the pilot is 100 miles from the airfield and that he is required to be at an altitude of 14,000 ft. at 20 miles from the airfield. He aligns the numeral 20 on the inner disc with the numeral 14 on the outer disc (i.e., the relative position of the discs shown in the drawing). If the pilot is now flying at 35,000 ft., he can read from his inner scale that he must start his descent at 72½ miles from the airfield, i.e., that he can maintain his existing altitude until that point. When his altitude has been reduced to 30,000 ft., he can read from the disc that he should be at a distance from the airfield of 60 miles. If his actual distance is less than this, he can increase his rate of descent until his values of altitude and distance-to-go again match those shown on the calculator.

In this way, he arrives at the altitude of 14,000 ft. at 20 miles from the airfield, as required, without starting his descent too early.

By then continuing at this gradient, the pilot reaches the altitude at which, in this example, there is provided a deceleration interval. During this interval, he decelerates from the higher speed (340 knots) to the lower speed (250 knots), after which he continues at the lower speed until he reaches circuit altitude.

Figure 2:
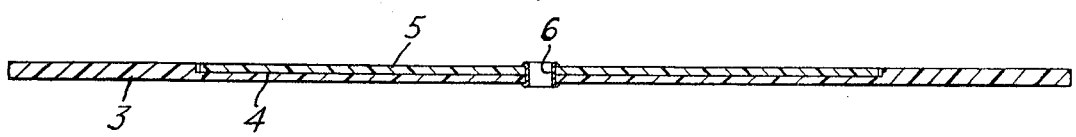
FIG. 2 is a sectional view of the calculator shown in FIG. 1, taken on the line II—II.

On the calculator shown, the altitude scale shows in numerals of small size, a further set of FIGS. 0-10, showing the possibility of an approach without the deceleration interval.

The device is extremely simple to manufacture and, as explained above, it reduces operational costs, improves safety and increases the capacity of the air traffic control system.

Although the above discussion has been primarily in terms of descent paths, a device embodying the invention can also be used to determine climb paths. A linear outer scale provides guidance if using variable power to achieve the desired rate of climb against ground speed; or a non-linear scale, suitable for a particular weight and temperature, can be used to predict a constant power climb.

In addition, a device embodying the invention could be used to calculate the required rate of descent if an aircraft is held by air traffic control significantly above the required profile. Alternatively a solution might be obtained using a series of concentric scales depicting the range of gradients the aircraft could achieve in various configurations and at appropriate indicated airspeeds, e.g., with speed brakes extended, undercarriage down, etc.

When operating an unpressurised aircraft, the rate of descent should not exceed 300 ft. per minute for passenger comfort. A calculator can be produced to define a profile, with a constant rate of descent but varying forward speed, which would be required by such a procedure.

For supersonic aircraft, a non-linear altitude scale would describe the profile to suit the various phases of descent, i.e., supersonic, transonic and subsonic, as determined by the aircraft's flight envelope. A separate scale may show an entirely subsonic descent.

The calculator can be used to show the correct slope to the runway that an aircraft should follow during its final approach to land. It is especially useful during approaches made with no glideslope information but with distance readout available, for example VOR letdowns. The normal final approach path is close to 3°/300 feet per mile gradient (as used by the calculator for an aircraft at 250-280 knots clean). An outer scale may depict a multi-slope glide path, for example 6° becoming 3° a few miles from the runway threshold, as presently contemplated.

I claim:

1. A flight path calculator calibrated to display the descent path for a selected type of aircraft, comprising:
   a first member having a distance scale increasing linearly in a predetermined direction and calibrated in units of distance;
   a second member having an altitude scale increasing in said predetermined direction and calibrated in units of altitude, said altitude scale consisting of three portions: (a) a first portion having a range from zero to a predetermined deceleration altitude and calibrated such that equal lengths of said first portion and said distance scale correspond to units of descent and the distance flown by said aircraft during said descent, respectively, at the indicated air speed for flight of said aircraft below said deceleration altitude; (b) a second portion in which the altitude indicia is maintained at said deceleration altitude and having a length relative to said distance scale corresponding to the distance said aircraft would travel while decelerating from the indicated air speed for flight of said aircraft above said deceleration altitude to said indicated air speed below said deceleration altitude, one end of said second portion being coincident with the said deceleration altitude indicium of said first portion; and (c) a third portion having a range from said deceleration altitude to a selected maximum altitude and calibrated such that equal lengths of said third portion and said distance scales correspond to units of descent and the distance flown during that descent, respectively, at said speed above said deceleration altitude, said deceleration altitude indicium of said third portion being coincident with the other end of said second portion; and
   means for constraining said first and second members to move relative to each other while maintaining said distance and altitude scales juxtaposed so that the markings on one can be read off against the markings on the other.

2. A calculator as defined in claim 1, in which both members are circular and the coupling means interconnects the said members coaxially for relative rotation about the common axis.

* * * * *